INVENTOR.
FRANZ JOSEF VON BOMHARD

# United States Patent Office 2,974,765
Patented Mar. 14, 1961

2,974,765

AUTOMOTIVE CLUTCH CONTROL SYSTEM

Franz Josef von Bomhard, Schweinfurt (Main), Germany, assignor to Fichtel & Sachs A.G., Schweinfurt (Main), Germany, a corporation of Germany Filed Feb. 5, 1959, Ser. No. 791,482

Claims priority, application Germany Feb. 6, 1958

5 Claims. (Cl. 192—3.5)

The present invention relates to automatic clutch control systems of the type wherein the clutch of an automotive vehicle is disengaged during gear shifting and is reengaged at a controlled rate after gear shifting has been completed, the rate of reengagement being variable according to engine conditions so that both sudden jerks and undue slippage of the clutch are avoided.

The control system in accordance with the invention involves a control circuit which controls a solenoid valve, for example. The control circuit is energized during the shifting of gears. Where a manually operated gear shift lever is provided, the control circuit is energized while the gear shift lever is in transit between any two gear ratio selecting positions. Energization of the control circuit causes immediate and complete disengagement of the clutch by a suitable power operated clutch actuating device. Deenergization of the control circuit immediately causes a limited reengagement of the clutch accompanied by clutch slippage so that a sudden jerking of the vehicle is avoided. Thereafter, and depending upon engine operating conditions, the clutch is fully reengaged at a rate such that needless slippage of the clutch is prevented while at the same time, sudden or jerky reengagement is prevented.

The controlled rate of complete reengagement is obtained by utilization of the prevailing air pressure at the air inlet or upstream side of the butterfly valve of the carburetor. In another embodiment of the invention, the intake manifold pressure is used in conjunction with the air inlet pressure to obtain the desired rate of full clutch reengagement.

The invention will be better understood from the following specification, reference being had to the accompanying drawing forming a part hereof.

Referring to the drawing.

Figure 1:
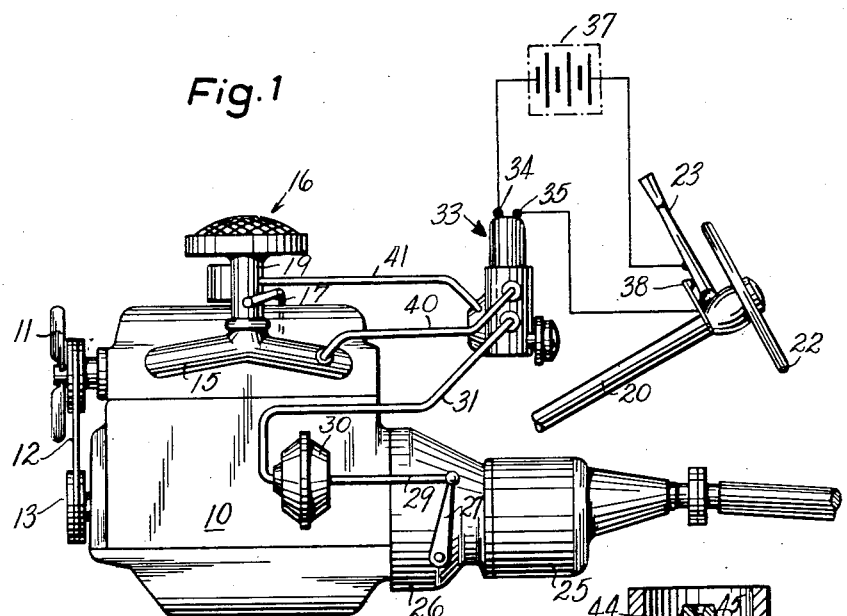
Figure 1 is a schematic diagram showing the general arrangement of a clutch control system embodying the invention.

Referring to Fig. 1, there is shown the internal combustion engine 10 of an automotive vehicle. The engine 10 is provided with the usual cooling fan 11 driven by a fan belt 12 from a pulley 13 fixed to the crankshaft (not shown) of the engine 10. The engine 10 has an intake manifold 15 to which is connected a carburetor designated generally as 16. The carburetor 16 includes an accelerator lever 17 which is connected to the usual accelerator pedal (not shown). The accelerator lever 17 controls the position of a butterfly valve 18 (Fig. 2) disposed in the outlet duct 19 of the carburetor 16.

The vehicle is also provided with a steering column 20 upon which there is mounted a steering wheel 22 and a gear shift lever 23. The gear shift lever 23 may be manually displaced to select a desired one of a plurality of gear ratios within a transmission 25. The transmission 25 is connected to the engine 10 through a clutch 26. The clutch 26 is provided with a control lever 27 which, when rotated in a counterclockwise direction as viewed in Fig. 1, will always disengage the clutch 26 when it would otherwise be engaged. The clutch 26 may be of the self-engaging type such as a centrifugal clutch or it may be selectively disengaged at will by operation of a foot pedal. Similarly, it may be automatically engaged and disengaged by other means depending on engine speed or a combination of engine speed and vehicle speed conditions. Regardless of the particular form of construction of the clutch 26, it will always become disengaged when it would otherwise be engaged by movement of the clutch control lever 27 as described above. It will become reengaged progressively as the control lever 27 is rotated in a clockwise direction as viewed in Fig. 1. Sudden and complete clockwise movement of the control lever 27 will cause abrupt reengagement of the clutch 26 and this undesirable type of reengagement is prevented by the control system of the present invention in a manner later to be described.

The clutch control lever 27 is connected by a rod 29 to a vacuum-operated servomotor 30. The servomotor 30 is connected by a suction line 31 to a solenoid-actuated control valve designated generally as 33. The solenoid valve 33 is provided with an operating winding (not shown) which is connected to terminals 34 and 35. The energizing or control circuit for the solenoid valve 33 includes a battery 37 and normally opens contacts 38 mounted on the steering column 20 and actuated by the gear shift lever 23. Whenever the gear shift lever 23 is in an intermediate position of transit between two operating positions so that no gear ratio is effective in the transmission 25, the contacts 38 are closed. In all operating positions of the gear shift lever 23, the contacts 38 are open. The contacts 38 are also open whenever the gear shift lever 23 is in its neutral position since there is then no need to disengage the clutch 26.

With the contacts 38 closed, the servomotor suction line 31 is connected to a main suction line 40 which leads directly to the intake manifold 15. This causes operation of the servomotor 30 to produce immediate and complete disengagement of the clutch 26. When the contacts 38 open, the solenoid valve connects the servomotor 30 with the atmosphere, at first substantially directly, so that an immediate partial reengagement of the clutch 26 is obtained. Thereafter flow-restricting devices delay the restoration of full atmospheric pressure in the servomotor 30 so that full reengagement of the clutch 26 takes place smoothly and progressively.

Figure 2:
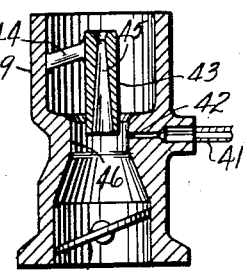
Figure 2 is an enlarged fragmentary view in sectional elevation showing the arrangement of the air inlet pressure or suction connection at the upstream side of the butterfly valve of the carburetor.
Figure 3:
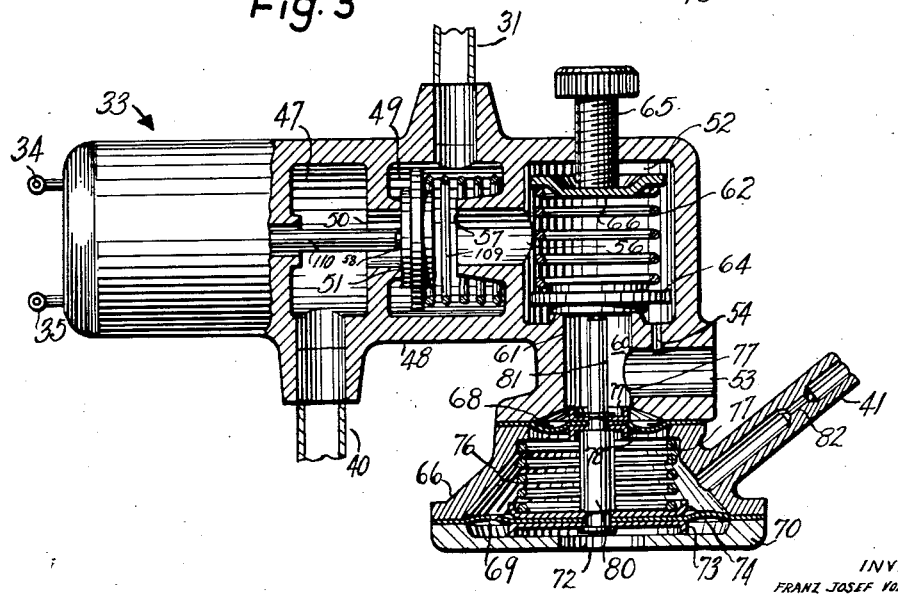
Figure 3 is an enlarged view in sectional elevation showing a solenoid actuated control valve which regulates the rate of clutch reengagement.

Referring to Figs. 1, 2 and 3, there is an auxiliary suction line 41 which extends between the carburetor 16 and the solenoid valve 33. At the carburetor 16, one end of the auxiliary suction line 41 communicates with the interior of the carburetor outlet duct 19 through a lateral orifice 42 formed in the wall of the duct 19. The orifice 42 is located immediately below a diffusing member 43. The diffusing member 43 is fixedly mounted on an arm 44, the arm 44 being fixed to the wall of the duct 19 so that the longitudinal passage 45 in the diffusing member 43 is coaxial with the duct 19. The diffusing member 43 serves to enhance the homogeneity of mixture of the air-fuel mixture which flows to the intake manifold 15 past the accelerator butterfly valve 18. It will be observed that the duct 19 is constricted to form a throat 46 and that the lateral orifice 42 is located at the throat 46 where the flow velocity is increased and the pressure correspondingly reduced when the butterfly valve 18 is widely open.

Referring to Fig. 3, the main suction line 40 communicates with a suction chamber 47 formed in the body 48 of the solenoid valve 33. The servomotor suction line 31 communicates with a central servomotor chamber 49 likewise formed in the body 48 of the solenoid valve 33. The suction and servomotor chambers 47 and 49 communicate with each other through a longitudinal passage 50 which terminates within the servomotor chamber 49 in a valve seat 51. Still another chamber 52 formed in the body 48 of solenoid valve 33 communicates continuously with the atmosphere through a main passage 53 and a metering orifice 54. The atmospheric pressure chamber 52 also communicates with the servomotor chamber 49 through a longitudinal passage 56 which is axially aligned with the passage 50 between the suction chamber 47 and the servomotor chamber 49. The passage 56 terminates within the servomotor chamber 49 in a valve seat 57. A double-faced valve member 58 is normally yieldingly pressed toward the left (as viewed in Fig. 3) into seating engagement with the valve seat 51 by a helical compression spring 109. The suction chamber 47 is thus normally shut off from communication with the servomotor chamber 49. Normally, the servomotor chamber 49 communicates with the atmospheric pressure chamber 52 through the passage 56 so that the servomotor suction line 31 is at atmospheric pressure.

Upon closure of the normally open switch contacts 38, the terminals 34 and 35 of the solenoid valve 33 are energized from the battery 37 and an actuating rod 110 is forced toward the right (as viewed in Fig. 3) so that the double-faced valve member leaves its normal engagement with valve seat 51 and engages the confronting valve seat 57. This energization of terminals 34 and 35 shuts off communication between the servomotor chamber 49 and asmospheric pressure chamber 52, placing the servomotor chamber 49 in communication with the suction chamber 47. Under these conditions, suction from the intake manifold 15 is transmitted over lines 40 and 31 to the servomotor 30 and the clutch control lever 27 is immediately displaced in a counterclockwise direction, thereby disengaging the clutch 26 during the shifting of gears. After gear shifting is completed, contacts 38 open and the servomotor suction line 31 is again placed in communication with the atmospheric pressure chamber 52. Restoration of full atmospheric pressure to the servomotor 30 is retarded, however, by the metering orifice 54. As hereinafter described in greater detail, an immediate partial restoration of atmospheric pressure takes place for partially reengaging the clutch 26 with clutch slippage which is followed by a controlled rate of complete reengagement, the slowest possible rate of complete clutch reengagement being determined by the metering orific 54.

A passage 60 communicates with the atmosphere through the passage 53. The passage 60 terminates within the atmospheric pressure chamber 52 in a valve seat 61. A helical compression spring 62 disposed within the atmospheric pressure chamber 52 yieldingly urges a valve member 64 into seating engagement with the valve seat 61. The pressure exerted by the spring 62 on the valve member 64 may be adjusted by means of a knurled adjusting screw 65 connected to a plate 66 against which the upper end of the spring 62 bears. The adjusting screw 65 is threaded into the body 48 of the solenoid valve 33. The spring 62 and valve member 64 together constitue a pressure regulating valve which remains closed in the absence of an adjustably predetermined minimum pressure differential between atmospheric pressure chamber 52 and the atmosphere.

The pressure differential at which the regulating valve 62—64 would otherwise remain open may be reduced so that complete clutch reengagement is accelerated. A frusto-conical collar 66 is disposed at the lower end of passage 60. A flexible diaphragm member 68 is clamped between the upper end of collar 66 and the body 48 of solenoid valve 33. A larger flexible diaphragm member 69 is clamped between the lower end of the collar 66 and a bottom plate 70. The bottom plate 70 is centrally apertured at 72 so that the underside of the diaphragm 69 is exposed to atmospheric pressure. At its center, the diaphragm 69 is clamped between lower and upper flat dish members 73 and 74, respectively. The rim of the lower dish member 73 bears against the cover plate 70. The rim of the upper dish member 74 guides the lower end of a helical compression spring 76. The upper end of compression spring 76 bears against a shoulder 77 formed on the inside of the collar 66 near its upper end. The dish members 73 and 74 are thus yieldingly urged downwardly by the spring 76, downward movement being limited by engagement of the lower dish member 73 with the cover plate 70.

The upper diagram 68 is centrally clamped between two flat-bottomed cup members 77 and 78. The dish members 73—74 and cup members 77—78 are rigidly interconnected by a vertical rod 80. A push rod 81 extends upwardly from the upper end of the vertical rod 80. In the position shown in the drawing, the upper end of the push rod 81 is slightly spaced away from the lower surface of the valve member 64 so that there is now interference with the seating of the valve member 64 against the valve seat 61. The interior of the collar 66 communicates with the orifice 42 in the throat 45 of carburetor duct wall 19 through the auxiliary suction line 41. At a short distance from the collar 66, the suction line 41 is constricted to define a metering orifice 82. The orifice 82 serves to delay the effect of pressure changes in the carburetor throat 46 in their action on the diaphragms 68 and 69 to such extent as may be desired.

In operation, when the operator of the motor vehicle desires to shift gears, movement of the gear shift lever out of the position in which it is then located causes closure of contacts 38 and energization of terminals 34 and 35 of the solenoid valve 33. As described above, this connects the servomotor 30 with the intake manifold 15 through suction lines 31 and 40. When the gear shift lever is positioned to make the newly selected gear ratio effective in the transmission 25, contacts 38 open and remain open.

If the engine 10 is operating at low speed and the butterfly valve 18 is only slightly open, then substantially atmospheric pressure will prevail at the carburetor throat 46 and the upper end of vertical rod 81 will be slightly spaced away from the pressure regulating valve member 64. The pressure regulating valve 64–62–61–65 will therefore permit an immediate partial restoration of atmospheric pressure in the servomotor chamber 39 followed by a slow complete restoration through the orifice 54 and main atmospheric pressure passage 53. As a result, the clutch 26 is immediately partially reengaged, with an amount of clutch slippage which is appropriate for slow motor speed. The partial reengagement is followed by a slow complete reengagement the rate of which is determined solely by air flow through the orifice 54.

If, however, the engine is operating at high speed such that prolonged clutch slippage is objectionable, the butterfly valve 18 is relatively wide open and the rate of air flow through the carburetor throat 46 is a direct function piston displacement and hence engine speed. Substantal suction is then present in the line 41 from the carburetor throat 46 and thus also within the interior of the collar 66. Because, as shown in Fig. 3, the effective area of the lower diaphragm 69 is greater than that of the upper diaphragm 68, the suction within the collar 66 produces a net upward thrust on the vertical push rod 81 so that it presses the regulating valve member 64 upwardly, thus opposing the action of spring 62 and reducing the amount of pressure differential required to raise the valve member 64. This causes nearly full atmospheric pressure to be restored in servomotor chamber 49 immediately upon the opening of contacts 38 when the engine 10 is operating at high speed. The rate of complete clutch reengagement is thus greatly accelerated as contrasted with the rate of complete reengagement at low engine speeds and the amount of clutch slippage at high engine speeds is correspondingly reduced. Thus, the rate of complete clutch reengagement is automatically correlated with the engine speed for optimum clutch slippage and further so that jerky reengagement after the completion of gear shifting is prevented.

Figure 4:
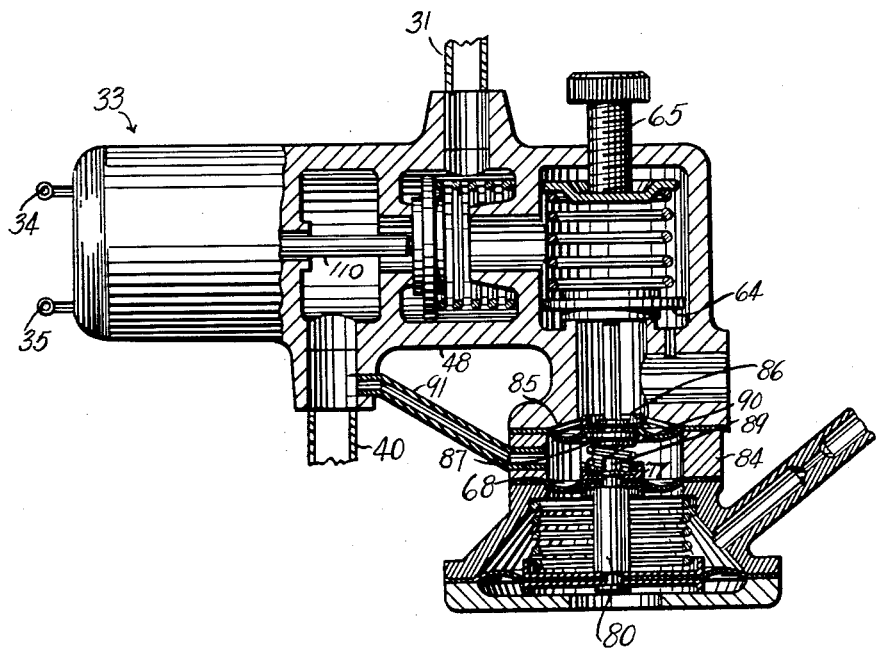
Figure 4 is similar to Fig. 3, showing a modified form of solenoid valve.

Figure 4 shows a modification of the solenoid valve of Fig. 3 which provides a further adjustment of the rate of complete clutch reengagement in accordance with the amount of suction prevailing in the intake manifold 15. An annular collar 84 is interposed between the frusto-conical collar 66 and the body 48 of the solenoid valve 33. An additional or top diaphragm 85 of the same area as the diaphragm 68 is clamped between the top of the annular collar 84 and the valve body 48. The center of the top diaphragm 85 is clamped between a flat-bottomed cup member 86 and a flat washer 87. The vertical push rod 81 extends upwardly from the cup member 86. An extension 89 of the vertical rod 80 projects above the cup member 77 and limits movement of the diaphragms 68 and 85 toward each other. A helical compression spring 90 extends between the cup member 77 and the flat washer 87 and yieldingly urges the diaphragms 68 and 85 apart. A suction line 91 connects the interior of the annular collar 84 with the suction line 49 leading to the intake manifold 15. The apparatus of Fig. 4 is otherwise identical with that previously described in connection with Fig. 3.

In operation, clutch disengagement takes place as set forth above. If, after shifting gears at low speed, the butterfly valve 18 is abruptly opened, there will be a reduction in manifold pressure before suction appears at the orifice 42 of carburetor throat 46. This reduction in manifold pressure is accompanied by an increase in engine speed which makes a more rapid clutch engagement desirable in order to take advantage of the increased engine torque and to obtain rapid pick-up or acceleration. This reduction in manifold pressure permits the compression spring 90 to expand, thereby producing an upward thrust on the push rod 81 before there is much suction within the frusto-conical collar 66. Thus, the desired rapid clutch reengagement is obtained when the engine is suddenly accelerated immediately after the completion of gear shifting.

While there have been shown what are believed to be the best embodiments of the invention, it will be apparent to those skilled in the art that various changes and modifications may be made therein without departing from the spirit and scope of the invention as defined in the appended claims.

What is claimed is:

1. An automotive clutch control system, comprising suction actuable servomotor means connected for disengaging said clutch when it would otherwise be engaged; an internal combustion engine in driving connection with said clutch, said engine including an intake manifold for delivering an air-fuel mixture to said engine; a transmission driven by said engine through said clutch; gear shifting means for selecting a desired gear ratio within said transmission; a solenoid valve having a suction chamber, a servomotor chamber and an atmospheric pressure chamber; an energizing circuit for said solenoid valve, said energizing circuit including switch means actuated by said gear shifting means for energizing said circuit during the changing of gear ratios in said transmission; a first suction line connecting said suction chamber to said intake manifold; a second suction line connecting said servomotor chamber to said servomotor means; means defining a metering orifice through which said atmospheric pressure chamber communicates with the atmosphere; a valve member actuable upon energization of said energizing circuit which transfers said servomotor chamber from communication with said atmospheric pressure chamber into communication with said suction chamber, said valve member restoring the original communications along said chambers immediately upon deenergization of said energizing circuit; a pressure regulating valve by-passing said metering orifice; and means responsive to the flow rate of said air-fuel mixture into said intake manifold connected to reduce the pressure differential required for operation of said pressure regulating valve, said pressure regulating valve permitting a partial restoration of atmospheric pressure in said atmospheric pressure chamber in accordance with said pressure differential immediately upon deenergization of said energizing circuit followed by full restoration of atmospheric pressure at a rate determined by said metering orifice.

2. A system according to claim 1, further comprising a carburetor having an outlet duct connected to said intake manifold, said outlet duct having a control valve disposed therein and a constricted throat portion in said outlet duct located upstream of said control valve, said throat portion having a lateral orifice formed therein, said means responsive to said flow rate including pressure actuated means connected to said throat portion orifice and acting on said pressure regulating valve to accelerate the rate of restoration of full atmospheric pressure in said atmospheric pressure chamber following deenergization of said energizing circuit.

3. A system according to claim 2, further comprising a second pressure actuated means connected to said intake manifold and acting on said regulating valve along with said first-named pressure actuated means to increase the rate of restoration of full atmospheric pressure in said atmospheric pressure chamber in reponse to increased pressure in said intake manifold.

4. A system according to claim 2, further comprising means defining a further metering orifice included in the connection between said throat orifice and said pressure actuating means for delaying the effect of pressure variations in said throat.

5. A system according to claim 1, further comprising pressure actuated means connected to said intake manifold and acting on said regulating valve to increase the rate of restoration of full atmospheric pressure in said atmospheric pressure chamber independently of said flow rate responsive means.

References Cited in the file of this patent

UNITED STATES PATENTS

| 2,107,724 | Whittington | Feb. 8, 1938 |
| 2,109,443 | Hill et al. | Feb. 22, 1938 |
| 2,111,290 | Kliesrath | Mar. 15, 1938 |
| 2,175,235 | Whittington | Oct. 10, 1939 |
| 2,252,136 | Price | Aug. 12, 1941 |
| 2,511,373 | Price | June 13, 1950 |
| 2,739,679 | Randol | Mar. 27, 1956 |